April 1, 1924.   L. A. HAZELTINE   1,489,228
METHOD AND MEANS FOR NEUTRALIZING CAPACITY COUPLING IN AUDIONS
Filed Dec. 28, 1920   2 Sheets-Sheet 1
Fig. 1,
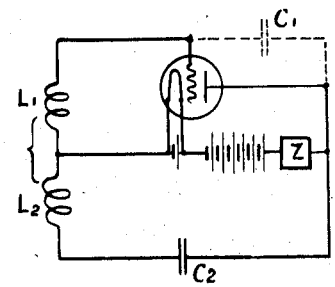
Fig. 2,
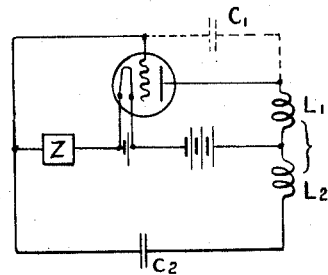
Fig. 3,
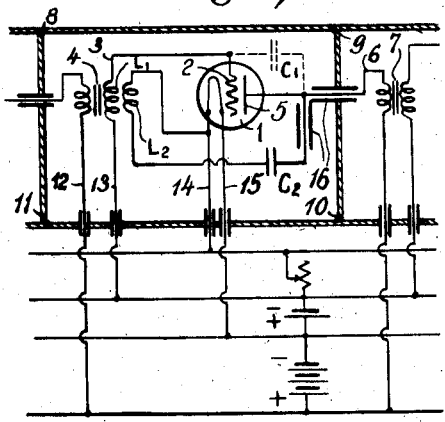
Fig. 4,
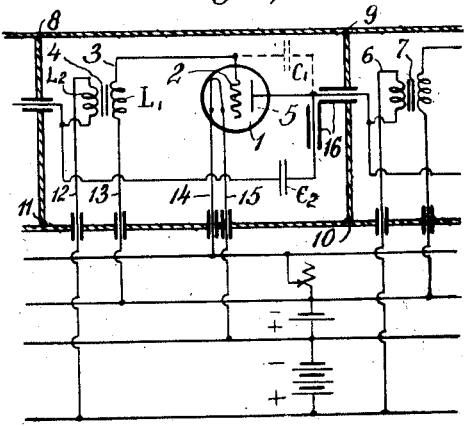
Fig. 5,
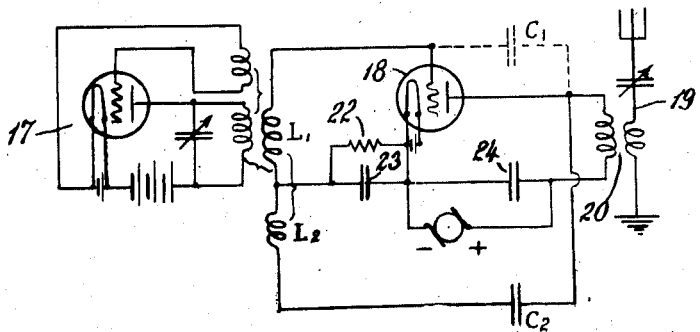
Inventor
Louis A. Hazeltine
By his Attorneys
Pennie, Davis, Marvin & Edmonds April 1, 1924.
L. A. HAZELTINE
1,489,228
METHOD AND MEANS FOR NEUTRALIZING CAPACITY COUPLING IN AUDIONS
Filed Dec. 28, 1920    2 Sheets-Sheet 2
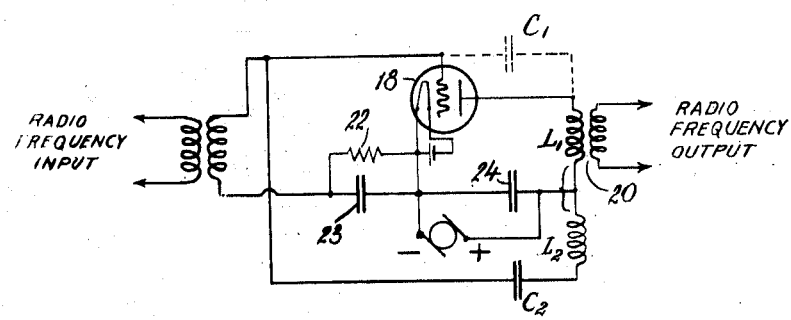
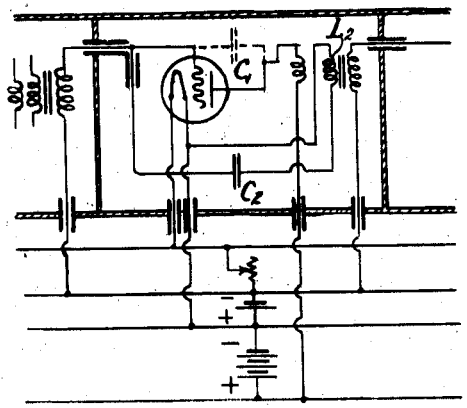 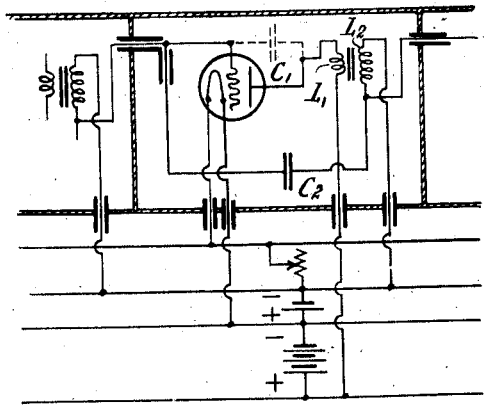
INVENTOR
Louis A. Hazeltine
BY Pennie, Davis, Marvin & Edmonds
ATTORNEYS Patented Apr. 1, 1924.

1,489,228

UNITED STATES PATENT OFFICE.

LOUIS A. HAZELTINE, OF HOBOKEN, NEW JERSEY, ASSIGNOR, BY MESNE ASSIGNMENTS, TO HAZELTINE CORPORATION, OF JERSEY CITY, NEW JERSEY, A CORPORATION OF DELAWARE.

METHOD AND MEANS FOR NEUTRALIZING CAPACITY COUPLING IN AUDIONS.

Application filed December 28, 1920. Serial No. 433,729.

*To all whom it may concern:*

Be it known that I, LOUIS A. HAZELTINE, a citizen of the United States, residing at Hoboken, in the county of Hudson, State of New Jersey, have invented certain new and useful Improvements in Methods and Means for Neutralizing Capacity Coupling in Audions; and I do hereby declare the following to be a full, clear, and exact description of the invention, such as will enable others skilled in the art to which it appertains to make and use the same.

This invention relates to the neutralizing of capacity coupling between the grid and plate circuits of an audion, which capacity coupling results in undersirable reactions of the plate circuit on the grid circuit. The term "audion," as used in this application, refers to any electric amplifying device containing an input electrode, referred to as the "grid"; and output electrode, referred to as the "plate"; and a common electrode, referred to as the "filament"; the electric power output being controlled electrostatically by the input voltage between the grid and the filament.

Capacity coupling between the grid and plate circuits of an audion may result in the production of oscillations. In some cases such oscillations are desired; but in other cases, particularly in amplifiers, such oscillations are very undesirable, as they may completely mask the signal which it is desired to amplify.

Again, capacity coupling causes the effective input capacity and the input conductance of the audion to vary with the impedance in the plate circuit, and frequently to reach undesirably high values. A high value of input conductance results in loss and thence in weakening of the signal to be amplified. A high value of input capacity may require a lower inductance in the coil connected to the grid circuit and thus result in a lower voltage being impressed on the grid. Capacity coupling therefore results in a diminution of the amplification attainable from an audion amplifier; and no method has heretofore been devised for eliminating this effect.

This invention is directed to the elimination of the undesirable effects of capacity coupling between the grid and plate circuits of an audion such as described above. This is accomplished by a special application of the general method disclosed in my United States Letters Patent No. 1,450,080, issued March 27, 1923, of which this is a continuation in part. An auxiliary circuit is provided which is electromagnetically coupled to one of the two original audion circuits, which we will call the first circuit, and capacitively coupled to the other, or second circuit. If a disturbing voltage then exists in the second circuit, it will cause currents to flow both in the first circuit and in the auxiliary circuit, due to the capacity couplings. The electromagnetic coupling between the auxiliary circuit and the first circuit is then arranged so that the magnetic effects of these two currents will neutralize one another and so will result in no voltage across the first circuit. Conversely, if a disturbing voltage exists in the first circuit, it will result in no voltage across the second circuit, by the well known reciprocal properties of electric circuits.

The arrangement of the auxiliary circuit will depend on the forms of the audion circuits. In some cases it is necessary to add coils to the original audion circuits to provide the required couplings, while in other cases the couplings may be obtained from coils present for other purposes.

The principle and application of this invention are illustrated in the accompanying drawings, in which:

Figure 1 is a circuit diagram showing an audion circuit with capacity coupling between the grid and the plate circuits and an arrangement for neutralizing this capacity coupling;

Figure 2 shows an alternative arrangement for neutralizing such capacity coupling;

Figure 3 shows a portion of a multistage audion amplifier with the arrangement of Figure 1 for neutralizing undesirable capacity coupling;

Figure 4 shows a simplification of Figure 3 by which one winding serves two purposes; and Figure 5 shows a radio-frequency oscillator and power amplifier with the arrangement of Figure 1 for neutralizing undesirable capacity coupling.

Figure 6 shows a radio-frequency amplifier with the arrangement of Figure 2 for neutralizing undesirable capacity coupling.

Fig. 7 shows a portion of a multistage audion amplifier with the arrangement of Fig. 2 for neutralizing undesirable capacity coupling; and Fig. 8 shows a simplification of Fig. 7 by which one winding serves two purposes.

Referring to Figure 1, reference character $L_1$ indicates a coil in the grid circuit of an audion, Z an impedance in the plate circuit, and $C_1$ the inherent coupling capacity between the grid and the plate, part of which is within the audion and part between the leads to the grid and the plate. To neutralize this capacity coupling, the auxiliary coil $L_2$ is closely coupled electromagnetically to the grid coil $L_1$ and is connected between the filament and the neutralizing capacity $C_2$, whose other terminal is connected to the plate. (By "closely coupled" in this discussion and those that follows is meant coupled with a coefficient of coupling substantially equal to unity.) If the plate potential varies, a current will flow through $C_1$ and $L_1$, and a second current through $C_2$ and $L_2$. If the capacity $C_2$ is so chosen relatively to the number of turns $N_1$ and $N_2$ of coils $L_1$ and $L_2$ respectively that $C_1/C_2$ is equal to $N_2/N_1$, then the magnetomotive force of $L_2$ will equal that of $L_1$ and will cancel it, provided that the coils have the proper relative polarity— viz, the terminals connected together being of unlike polarity. No voltage will then be induced in either coil and therefore no variation will occur in the grid potential due to the variation in the plate potential, assuming the resistances of the coils negligible in comparison with their reactances. Hence the effects of capacity coupling will have been eliminated.

Figure 2 differs from Figure 1 in that the auxiliary coil $L_2$ is coupled with a coil $L_1$ now in the plate circuit instead of the grid circuit, the neutralizing capacity $C_2$ is now connected to the grid instead of the plate; and the impedance Z is in the grid circuit instead of the plate circuit. If in this figure the plate potential varies, a voltage will be induced in $L_2$ by the current in $L_1$. Currents will then flow through $C_1$ and also through $C_2$. If the capacity ratio $C_1/C_2$ is equal to the ratio of turns $N_2/N_1$ of $L_2$ and $L_1$ respectively, then the currents through $C_1$ and $C_2$ will be equal, and no current will tend to flow between the grid and the filament. Hence the effects of capacity coupling will have been eliminated.

The principle and effectiveness of the above arrangements will in no way be altered if an impedance of any character is connected in parallel with $L_1$ or with $L_2$ or with $L_1$ and $L_2$ combined. This possibility is a consequence of the substantially unity coupling between $L_1$ and $L_2$. Further, the upper terminal of $L_2$ may terminate at any point in the filament system in Figs. 1 and 2, that is, at any point having substantially the same alternating-current potential as the filament, thus including either filament terminal or the positive terminal of the plate-circuit battery, since the batteries serve simply as conductors for variations in current.

In most applications of this invention it is desirable to employ a ratio of turns $N_2/N_1$ differing from unity. For example, as illustrated in Figs. 4 and 8, $L_1$ and $L_2$ may be the coils of an amplifier transformer, which commonly is arranged to step-up the voltage. Again, the coupling capacity $C_1$ is usually minute; and it might be inconvenient to provide an equal neutralizing capacity $C_2$, since this would be greatly affected in value by the length of connecting wires and by the proximity of other conductors and might be difficult to adjust. In this case $L_2$ would be given relatively few turns and $C_2$ a correspondingly higher value.

Figure 3 represents one stage and a portion of the succeeding stage of a multistage audion amplifier. The one stage completely shown comprises an audion 1, whose grid 2 is connected to the high-potential terminal 3 of the secondary coil $L_1$, of the input transformer 4, and whose plate 5 is connected to the high-potential terminal 6 of the primary coil of the output transformer 7, which is the input transformer of the succeeding stage. The audion and the input transformer of each stage are enclosed in a compartment having for its walls a conducting screen, as 8—9—10—11. The low-potential transformer leads 12 and 13 and the filament leads 14 and 15 pass out through holes in this screen and are suitably connected to the batteries, which may be common to all stages; while the lead 5—6 from the plate of one stage to the transformer primary of the succeeding stage passes through a hole in the screen 9—10 separating these stages. By this arrangement of screened compartments, the only possible capacity coupling between stages lies in the inherent capacity $C_1$ between the plate 5 with its leads and the grid 2 with its connected or coupled apparatus. This capacity coupling is neutralized, according to the principle of Figure 1, by connecting in series between the plate 5 and the filament lead 14 an auxiliary coil $L_2$ and a condenser $C_2$, the auxiliary coil $L_2$ being closely coupled electromagnetically with the transformer coil $L_1$, as by winding it around the same iron core. The relative polarity of these coils is such that the low-potential lead of $L_2$, connecting to filament lead 14, is of opposite polarity to the low-potential lead 13 of $L_1$. Complete neutralization of capacity coupling will be attained, as in Figure 1, when the number of turns $N_2$ of the auxiliary coil $L_2$ and the value of the neutralizing capacity $C_2$ are so chosen, relative to the number of turns $N_1$ of $L_1$ and to inherent coupling capacity $C_1$, that $$\left(\frac{C_1}{C_2}=\frac{N_2}{N_1}\right).$$

In order to make the coupling capacity $C_1$ as small as possible, the leads from the plate 5 to the terminal 6 and to $C_2$ should be short and preferably screened by enclosing them in a metal tube 16 electrically connected to the screen 8—9—10—11.

Figure 4 differs from Figure 3 in that coil $L_2$ here serves both as the transformer primary coil and as the auxiliary coil for neutralizing capacity coupling. Like reference characters refer to like parts throughout. The two transformer coils are closely coupled, as by winding them around the same iron cores, and their low-potential leads, 12 and 13, are of opposite polarity. Complete neutralization of capacity coupling will then be attained, as in Figures 1 and 2, when the value of the neutralizing capacity $C_2$ is so chosen, relative to the number of turns $N_1$ and $N_2$ of coils $L_1$ and $L_2$ respectively and to the inherent coupling capacity $C_1$, that $$\left(\frac{C_1}{C_2}=\frac{N_2}{N_1}\right).$$

In Figure 5 reference character 17 indicates a master radio-frequency oscillator which impresses a radio-frequency voltage on the grid of the power amplifier 18 through the coil $L_1$. The amplified oscillation is transferred to the antenna circuit 19 through the transformer 20. The direct current of the grid circuit flows through the resistance 22, the drop in which causes the grid to have a suitable negative bias. Condensers 23 and 24 serve as low-impedance radio-frequency shunts. This particular form of circuit is but one of a very large number that are suitable for generating oscillations, to any one of which this invention may be applied without essential change. In any case the arrangement for neutralizing capacity coupling due to the inherent capacity $C_1$ between the plate and the grid, following the principle of Figure 1, consists in connecting an auxiliary coil $L_2$ and a neutralizing capacity $C_2$ in series between the plate and the filament. Coil $L_2$ is closely coupled to $L_1$ and terminals of unlike polarity are connected together. Complete neutralization of capacity coupling will be attained, as in Figure 1, when the number of turns $N_2$ of the auxiliary coil $L_2$ and the value of the neutralizing capacity $C_2$ are so chosen, relative to the number of turns $N_1$ of $L_1$ and to the inherent coupling capacity $C_1$, that $$\left(\frac{C_1}{C_2}=\frac{N_2}{N_1}\right).$$

The alternative arrangement of Figure 2 may be applied to the neutralization of the capacity coupling in a radio-frequency power amplifier, as illustrated in Fig. 6.

Fig. 7 shows a portion of a multistage audion amplifier and follows the plan of Fig. 3 except only that the alternative arrangement of Fig. 2 is employed instead of that of Fig. 1. Fig. 8 is derived from Fig. 7 in the same way that Fig. 4 is derived from Fig. 3, that is, by employing for the auxiliary coil $L_2$ the transformer coil which is not associated with the coupling capacity $C_1$. The relative polarities and ratio of turns of coils $L_1$ and $L_2$ in Figs. 7 and 8 are selected by the same rules as given for the preceding figures.

I claim:

1. An electric circuit arrangement for neutralizing capacity coupling between the grid and plate circuits of an audion due to the capacity between the grid and plate electrodes, comprising a coil connected between one of these electrodes and the filament system and an auxiliary coil and a neutralizing capacity connected in series between the other of these electrodes and the filament system, said auxiliary coil being coupled electromagnetically to the first coil with a coefficient of coupling substantially equal to unity and having a ratio of turns thereto equal to the ratio of the coupling capacity to the neutralizing capacity.

2. An electric circuit arrangement for neutralizing capacity coupling between the grid and plate circuits of an audion due to the capacity between the grid and plate electrodes, comprising a coil connected between one of these electrodes and the filament system and an auxiliary coil and a neutralizing capacity connected in series between the other of these electrodes and the filament system, said auxiliary coil being coupled electromagnetically to the first coil with a coefficient of coupling substantially equal to unity and having a ratio of turns thereto equal to the ratio of the coupling capacity to the neutralizing capacity, said ratio differing from unity.

3. An electric circuit arrangement for neutralizing capacity coupling between the grid and plate circuits of an audion due to the capacity between the grid and plate electrodes, comprising a coil connected between the grid and the filament system and an auxiliary coil and a neutralizing capacity connected in series between the plate and the filament system, said auxiliary coil being coupled electromagnetically to the first coil with a coefficient of coupling substantially equal to unity and having a ratio of turns thereto equal to the ratio of the coupling capacity to the neutralizing capacity.

4. An electric circuit arrangement for neutralizing capacity coupling between the grid and plate circuits of an audion due to the capacity between the grid and plate electrodes, comprising a coil connected between the grid and the filament system and an auxiliary coil and a neutralizing capacity connected in series between the plate and the filament system, said auxiliary coil being coupled electromagnetically to the first coil with a coefficient of coupling substantially equal to unity and having a ratio of turns thereto equal to the ratio of the coupling capacity to the neutralizing capacity, said ratio differing from unity.

5. In an electric circuit including an audion, the combination of a conducting screen electrostatically isolating the plate circuit from the grid circuit, except for the plate proper and the leads thereto, a coil in the grid circuit and an auxiliary coil and a neutralizing capacity connected in series between the plate and the filament system, said auxiliary coil being coupled electromagnetically to the first coil with a coefficient of coupling substantially equal to unity and having a ratio of turns thereto equal to the ratio of the coupling capacity to the neutralizing capacity.

6. In an electric circuit including an audion, the combination of a conducting screen electrostatically isolating the plate circuit from the grid circuit, except for the plate proper and the leads thereto, a coil in the grid circuit and an auxiliary coil and a neutralizing capacity connected in series between the plate and the filament system, said auxiliary coil being coupled electromagnetically to the first coil with a coefficient of coupling substantially equal to unity and having a ratio of turns thereto equal to the ratio of the coupling capacity to the neutralizing capacity, said ratio differing from unity.

7. In an electric circuit including an audion and a step-up transformer whose secondary is connected in the grid circuit of said audion, the combination of a conducting screen electrostatically isolating the plate circuit of said audion from the grid circuit, except for the plate proper and the leads thereto, and a capacity connected between the plate of said audion and the primary of said transformer.

8. In a multistage amplifier including an input transformer and an audion in each stage, the combination of a conducting screen electrostatically isolating all stages from each other, except for the plate of each audion and the lead therefrom to the input transformer of the succeeding stage, a coil electromagnetically coupled to the secondary of said transformer in each stage, and a capacity in each stage, said coil and said capacity in each stage being connected in series between the plate and the filament system of the audion in that stage, said filament system comprising all points having substantially the same alternating-current potential as the filament.

9. In a multistage amplifier including an input transformer and an audion in each stage, the combination of means electrostatically isolating all stages from each other, except for the lead from the plate of each stage to the input transformer of the succeeding stage, and a capacity connected between the plate of each stage and the primary of said input transformer of that stage.

10. In a multistage amplifier including an audion in each stage, the combination of a transformer coupling audions in adjacent stages, one terminal of said transformer being connected to a grid electrode and a terminal of the other winding thereof being connected to a plate electrode of an adjacent audion, said terminals being of opposite polarity, and a capacity connecting the plate electrodes of the adjacent audions.

11. In a multistage amplifier including an audion in each stage, a transformer coupling the audions of adjacent stages and having such polarity that the primary terminal connected to the plate of one audion is of opposite polarity to the secondary terminal connected to the grid of the succeeding audion, and a capacity connecting the plate electrodes of the audions in adjacent stages.

12. In an electric circuit arrangement comprising an audion having a common electrode, an input electrode, and an output electrode, an input circuit, an output circuit, a coil connected between said input electrode and said common electrode, a second coil connected to said common electrode, and inherent capacity between said input and output electrodes and the connections thereto, the method of neutralizing the capacity coupling between the input and output circuits resulting from said inherent capacity, which consists in coupling said coils electromagnetically with a coefficient of coupling substantially equal to unity, in arranging said coils with terminals of unlike polarity connected to said common electrode, and in introducing such capacity between the second of said coils and said output electrode that the magnetomotive force of the current produced in said second coil by a variation in the potential of the output electrode will equal and cancel the magnetomotive force of the current simultaneously produced in said first coil, whereby no voltage is induced in either coil and therefore no variation will occur in the potential of said input electrode due to the variation in the potential of said output electrode.

In testimony whereof I affix my signature.

LOUIS A. HAZELTINE.